United States Patent
Arakawa et al.

(10) Patent No.: US 7,185,048 B2
(45) Date of Patent: Feb. 27, 2007

(54) BACKUP PROCESSING METHOD

(75) Inventors: Hiroshi Arakawa, Tokyo (JP);
Haruaki Watanabe, Tokyo (JP);
Yoshinori Okami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 654 days.

(21) Appl. No.: 09/943,982

(22) Filed: Aug. 30, 2001

(65) Prior Publication Data
US 2002/0144069 A1 Oct. 3, 2002

(30) Foreign Application Priority Data
Mar. 29, 2001 (JP) ............................ 2001-095789

(51) Int. Cl.
G06F 15/16 (2006.01)
G06F 17/30 (2006.01)
(52) U.S. Cl. .................. 709/202; 709/226; 707/204
(58) Field of Classification Search ............. 709/238, 709/244, 239, 201, 202, 226; 707/204; 711/162
See application file for complete search history.

(56) References Cited

U.S. PATENT DOCUMENTS

| | | | | |
|---|---|---|---|---|
| 5,448,718 A | * | 9/1995 | Cohn et al. | 707/204 |
| 5,652,908 A | * | 7/1997 | Douglas et al. | 709/228 |
| 5,673,381 A | * | 9/1997 | Huai et al. | 711/162 |
| 5,832,197 A | * | 11/1998 | Houji | 709/239 |
| 5,948,108 A | * | 9/1999 | Lu et al. | 709/227 |
| 5,966,730 A | * | 10/1999 | Zulch | 707/204 |
| 6,304,980 B1 | * | 10/2001 | Beardsley et al. | 707/204 |
| 6,704,849 B2 | * | 3/2004 | Steegmans | 711/162 |
| 6,804,690 B1 | * | 10/2004 | Dysert et al. | 707/204 |
| 6,831,898 B1 | * | 12/2004 | Edsall et al. | 370/256 |

FOREIGN PATENT DOCUMENTS

JP 2000-242437 9/2000

OTHER PUBLICATIONS

Armstead et al. "Implementation of a Campus-wide Distributed Mass Storage Service: The Dream vs. Reality", from Mass Stroage Systems, IEEE, 1995, pp. 190-1999.*

* cited by examiner

Primary Examiner—Saleh Najjar
Assistant Examiner—David Lazaro
(74) Attorney, Agent, or Firm—Townsend and Townsend and Crew LLP

(57) ABSTRACT

A backup processing method for backing up data to be used by a data-processing computer system comprises selecting resources in a usable state from a plurality of resources necessary for the data to be used by the data-processing computer system, selecting switches in a usable state from a plurality of switches needed to form routes among said selected resources, and executing backup processing by using the secured resources and routes when the resources and routes necessary for backing up data to be used by the data processing computer system are secured to form multiple backup subsystems.

15 Claims, 8 Drawing Sheets

| process number | time | object |
|---|---|---|
| 0 | 10/10/00 22:00 | X: |
| 1 | 10/10/00 22:30 | /pictures |
| 2 | 10/10/00 23:00 | /movies |
|  |  |  |

| server number | server name | state | process number | stream number |
|---|---|---|---|---|
| 0 | A | usable | — | — |
| 1 | B | in use | 0 | 1 |
| 2 | C | not usable | — | — |
|  |  |  |  |  |

| library device number | library device name | state | process number | stream number |
|---|---|---|---|---|
| 0 | A | usable | — | — |
| 1 | B | in use | 0 | 1 |
| 2 | C | not usable | — | — |
|  |  |  |  |  |

| tape number | state | process number | stream number |
|---|---|---|---|
| 0 | usable | — | — |
| 1 | in use | 0 | 1 |
| 2 | not usable | — | — |
|  |  |  |  |

FIG.6

| FC switch number | FC switch name | state | process number | stream number |
|---|---|---|---|---|
| 0 | A | usable | — | — |
| 1 | B | in use | 0 | 1 |
| 2 | C | not usable | — | — |
|  |  |  |  |  |

450

460

| object | start time | end time | data time | library device number | tape number | data position | data size |
|---|---|---|---|---|---|---|---|
| X: | 10/10/00 22:00 | 10/10/00 22:29 | 10/10/00 22:00 | 1 | 1 | 0 | 60000 |
| /pictures | 10/10/00 22:30 | 10/10/00 22:59 | 10/10/00 22:15 | 2 | 2 | 10000 | 20000 |
| /movies | 10/10/00 23:00 | 10/10/00 23:59 | 10/10/00 22:55 | 4 | 5 | 40000 | 50000 |
| | | | | 6 | 7 | 30000 | 1000 |
| | | | | | | | |

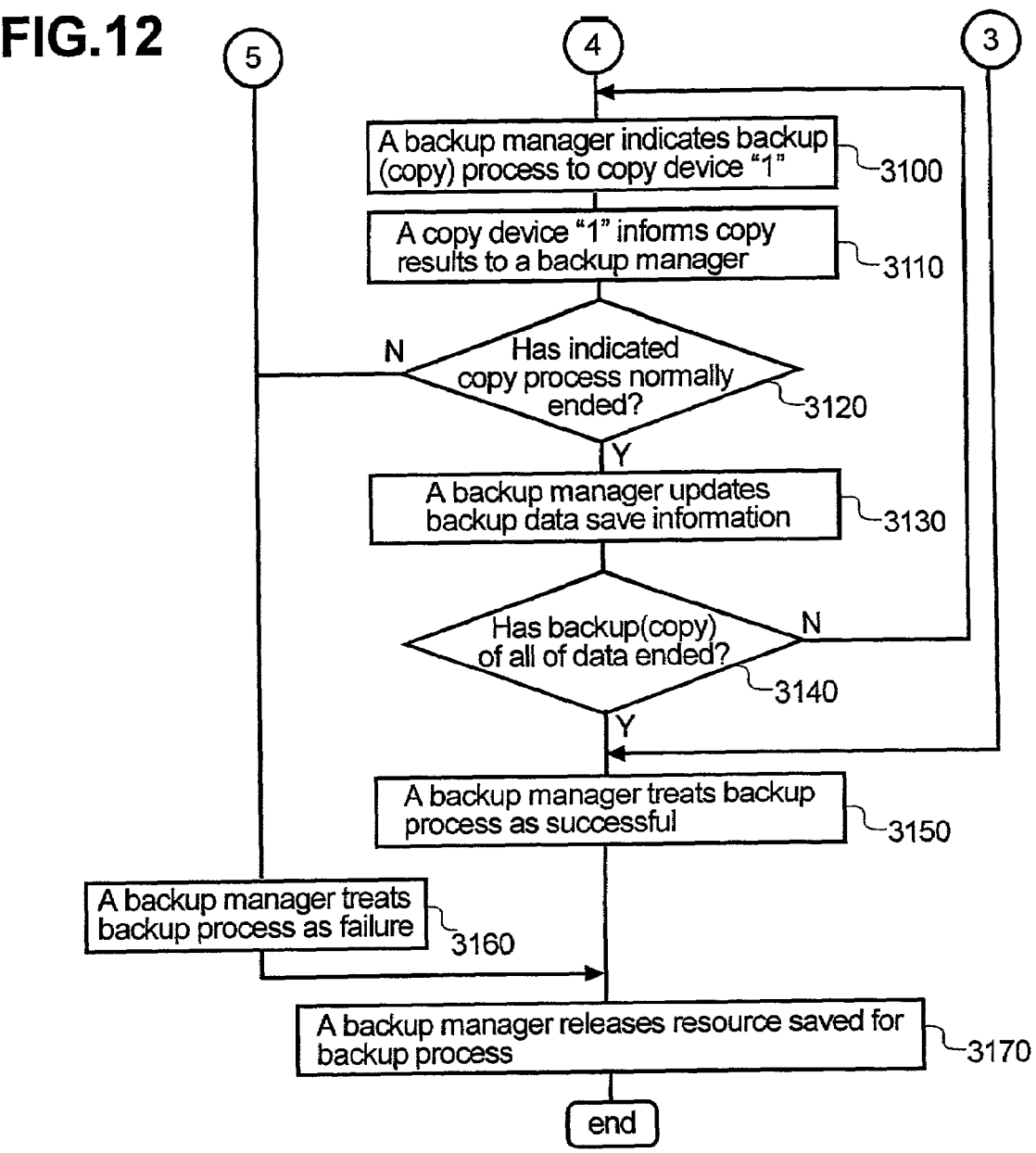

BACKUP PROCESSING METHOD

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates generally to a backup processing system for data processing systems executing on-line processing and batch processing, and more particularly to backup processing technology capable of preventing backup processing delays when trouble occurs during a backup operation.

On-line processing and batch processing in data processing systems of banks, securities firms, etc., sometimes terminate abruptly due to bugs in the programs, trouble with storage devices, etc., leaving data in an inconsistent state. Moreover, data are sometimes erased by human errors made during data processing. Several means are known for correcting the inconsistencies in such data, restarting the data processing or redoing such data processing from scratch. One means restores a data processing system by backing up data from time to time and restoring the data if trouble has occurred.

With the means for backing up and restoring data, data of a database system, for example, are regularly backed up to a storage medium such as magnetic tape. If trouble occurs in the database system, the data are restored from the magnetic tape to the database system storage device. The backup system dates back to an appropriate point in time to reconstruct the data in the storage device of the database system. Thus the data of the database system are restored so that processing can recommence.

In the case of batch processing, the data in the system's storage device are backed up on magnetic tape prior to batch processing. If batch processing comes to an irregular end, the data are restored from the magnetic tape to the storage device, and then batch processing is started again from scratch.

JP-A-242437/2000 discloses a storage-device system which makes a copy of data to be backed up in its storage device so that backup data can be made not from the data, but from the copy; therefore access to the data in the storage device is not disrupted even while the data are being backed up.

Sometimes, data are being backed up on magnetic tape, as described above, backup processing comes to an irregular end due to trouble with the magnetic tape drive or the magnetic tape. In this case, another magnetic tape drive and another magnetic tape must be readied, the data-backup processing must be redone from scratch, and backup processing takes a long time.

Recently, the amount of data input to data processing systems has burgeoned, increasing the amount of data which need to be backed up. In contrast, the time allocated for data-backup processing has been decreasing in order to minimize the effects of data-backup processing on on-line business affairs. If data-backup processing of a system ends irregularly, data-backup processing has to be redone from scratch. Thus data-backup processing takes much longer to be completed than the time allocated for such processing, and may affect on-line business affairs.

With the storage-device system of JP-A-242437/2000, the effects of irregular termination of backup processing on online business affairs can be lessened. However, if data-backup processing terminates irregularly, the back-up has to be redone from scratch; accordingly the data backup takes a long time to complete and the process ties up resources such as magnetic tape drives and data transfer routes for a long time.

SUMMARY OF THE INVENTION

In accordance with the above, an object of the present invention is to provide a technology capable of preventing backup processing from being prolonged when trouble occurs during backup.

According to the present invention, resources and routes necessary for backup processing are dynamically secured to form a plurality of backup subsystems in a backup processing system for backing up data from a data processing computer system. Backup processing is executed by the subsystems.

In the backup processing system of the present invention, the states of a plurality of resources such as backup servers, library devices, etc., required for data-backup processing are managed; resources in a usable state are selected from the managed resources; and switches in a usable state are selected from a plurality of switches needed to form routes among the selected resources.

The system checks whether the resources and routes forming a plurality of backup processing subsystems are secured. If the resources and routes are secured, backup processing is executed using the secured resources and routes.

When backup processing has been successfully executed by at least one subsystem, the backup is considered successful. Alternatively, data may be backed up by at least one subsystem, and if trouble occurs during backup processing, the backup is continued using other resources and routes.

As described above, in the backup processing system of the present invention, resources and routes needed for backing up data to be used by a data processing computer system are dynamically secured to form a plurality of backup subsystems, and backup processing is executed; therefore, backup processing is prevented from being prolonged when trouble occurs during backup.

Other and further objects, features and advantages of the invention will appear more fully from the following description read in conjunction with the drawings.

BRIEF DESCRIPTION OF THE DRAWINGS

A preferred form of the present invention is illustrated in the accompanying drawings in which:

FIG. 2 is an example of the backup processing information 410 held by the backup manager 400;

FIG. 3 is an example of backup server information 420;

FIG. 4 is an example of library device information 430;

FIG. 5 is an example of tape information 440 held by the backup manager 400;

FIG. 6 is an example of FC switch information 450;

FIGS. 11 and 12 show a flowchart of backup processing steps performed by backup manager 400; and FIG. 13 is an example of the copy device information 470 held by the backup manager 400.

DETAILED DESCRIPTION OF THE INVENTION

A preferred embodiment of the backup processing system of the present invention is described below with reference to the drawings.

Figure 1:
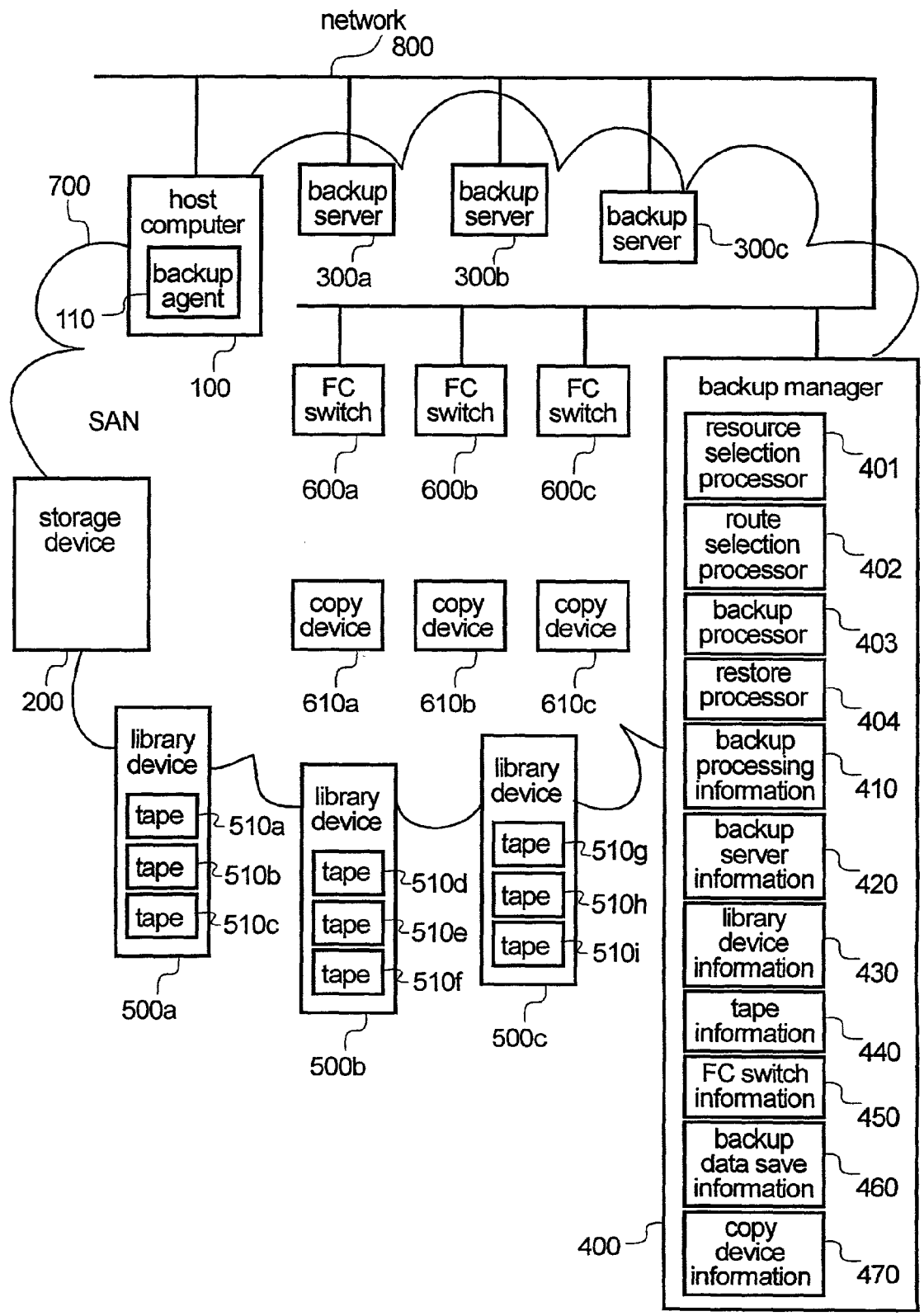
FIG. 1 is a schematic block diagram of an embodiment of the backup processing system of the present invention.

As shown in FIG. 1, a backup processing system is provided with a backup manager 400, which has a resource selection processor 401, a route selection processor 402, a backup processor 403, and a restore processor 404.

Resource selection processor 401 selects resources in a usable state from a plurality of resources such as backup servers 300, library devices 500, tapes 510, etc., required for backup of data to be used in data processing by a host computer 100.

Route selection processor 402 selects FC (Fibre Channel) switches in a usable state from a plurality of FC switches 600 to form routes among the selected resources. When the resources and routes required to back up data for use by host computer 100 are secured to form a plurality of backup subsystems, backup processor 403 performs a backup operation, using the selected resources and routes.

Restore processor 404 finds the storage areas of backup data by using information relating backup data to their storage areas and restores data into a storage device 200 of host computer 100.

A program which controls the backup manager 400 to function as the resource selection processor 401, the route selection processor 402, the backup processor 403, and the restore processor 404 is recorded in a storage medium such as a CD-ROM, stored in a magnetic disk or the like, and then loaded in memory and executed. The program may be recorded in storage media other than CD-ROM. The program may be loaded from the storage medium of the program into a data processing device, or the storage medium of the program may be accessed through a network to use the program.

The backup processing system comprises host computer 100, storage device 200, backup servers 300, backup manager 400, library devices 500, fibre-channel switching devices, or FC switches, 600, and copy devices 610 that make copies of data in the host computer 100 in accordance with backup instructions.

Host computer 100, backup servers 300, backup manager 400, and FC switches 600 are connected by a network 800. Host computer 100, storage device 200, backup servers 300, backup manager 400, library devices 500, and copy devices 610 consist of the FC switches 600 and are connected by a SAN (Storage Area Network) 700 for data transfer.

Host computer 100 has a backup agent 110 that controls the application software and database-management software of host computer 100 for backup processing. Storage device 200 records and reproduces data to be used in accordance with requirements of host computer 100. A single magnetic disk drive, a magnetic disk drive with a controller of a RAID (Redundant Array of Inexpensive Disks) type, or the like, may be used as storage device 200.

Each library device 500 has a plurality of tapes 510 and reads data from and writes data into a tape 510, which is selected by external control, in accordance with the read and write commands from a device connected to the library device 500. In the data backup processing described later, library devices 500 store copies (backup data) of the data that are stored in storage device 200 and used by host computer 100.

Host computer 100, backup servers 300, and backup manager 400 have components such as memories and CPUs that are necessary for computers, but their having such components is not important for the present embodiment; therefore the details of such components are not be described here.

In the data-backup processing described below, backup manager 400 backs up the data stored in storage device 200 within a given time, in accordance with a schedule, by securing multiple resources needed for backup processing and then instructing the backup servers 300 so secured to execute the backup.

An example of backup processing information 410 held by the backup manager 400 is now described with reference to FIG. 2. "Process Number" means numbers allotted to backup processes. "Time" means the time and date when each backup process is to start. The "Object" column lists information that identifies the data in storage device 200 to be backed up. The information may identify logical or physical volumes, file names (identifiers), database table names (identifiers), or the like.

Backup manager 400 contains various items of information shown in FIGS. 3 to 6 to manage the various resources mentioned above.

An example of backup server information 420 is described with reference to FIG. 3. The "Server Number" column contains numbers that identify the backup servers 300. The "Server Name" column contains the names (identifiers) of the backup servers 300. The "State" column shows the state of each backup server 300; i.e., usable, in use, or not usable. When a backup server 300 is executing a backup process in accordance with a data set in backup processing information 410, the process number of the data set is shown in the "Process Number" column. The numbers in the "Stream Number" column distinguish the multiple copies, to be made as described later, of data in a backup process.

An example of library device information 430 is now described with reference to FIG. 4. The numbers in the "Library Device Number" column identify library devices 500. The codes (identifiers) in the "Library Device Name" column identify library devices 500. The "State," "Process Number," and "Stream Number" columns contain information relating the library devices and backup processes, as in the case of the backup server information 420.

Backup manager 400 contains tape information 440 about tapes 510 in each library device 500. An example of that information is now described with reference to FIG. 5. The numbers in the "Tape Number" column of tape information 440 identify the tapes 510 of a library device 500. The "State," "Process Number," and "Stream Number" columns contain information relating the tapes and backup processes, as in the case of backup server information 420.

An example of FC switch information 450 is described with reference to FIG. 6. The numbers in the "FC Switch Number" column identify FC switches 600. The codes (identifiers) in the "FC Switch Name" column further identify FC switches 600. The "State," "Process Number," and "Stream Number" columns contain information relating the FC switches 600 and backup processes as in the case of the backup server information 420.

Figure 7:
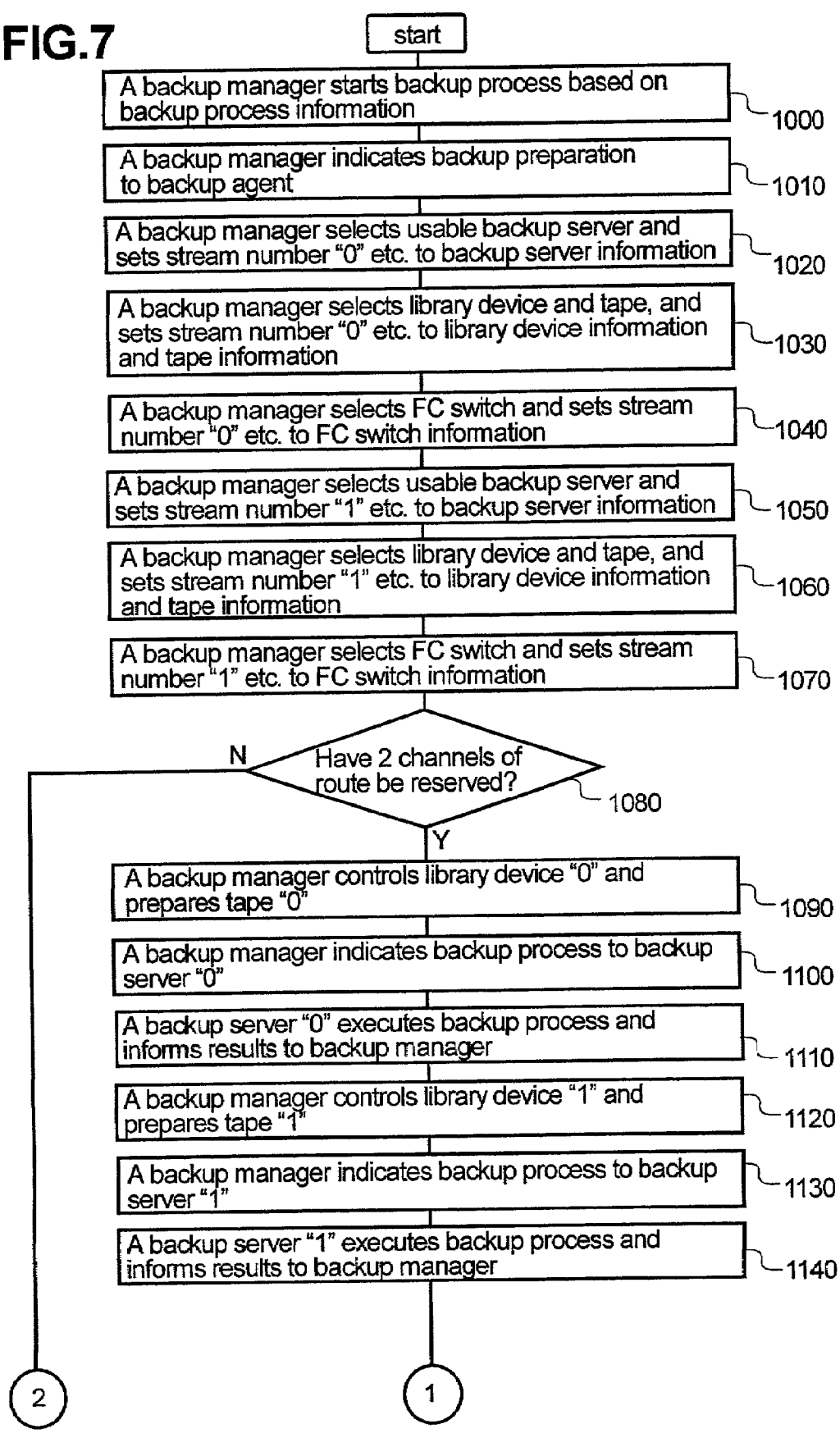
FIGS. 7 and 8 show a flowchart of backup processing steps performed by backup manager 400.
Figures 8, 9:
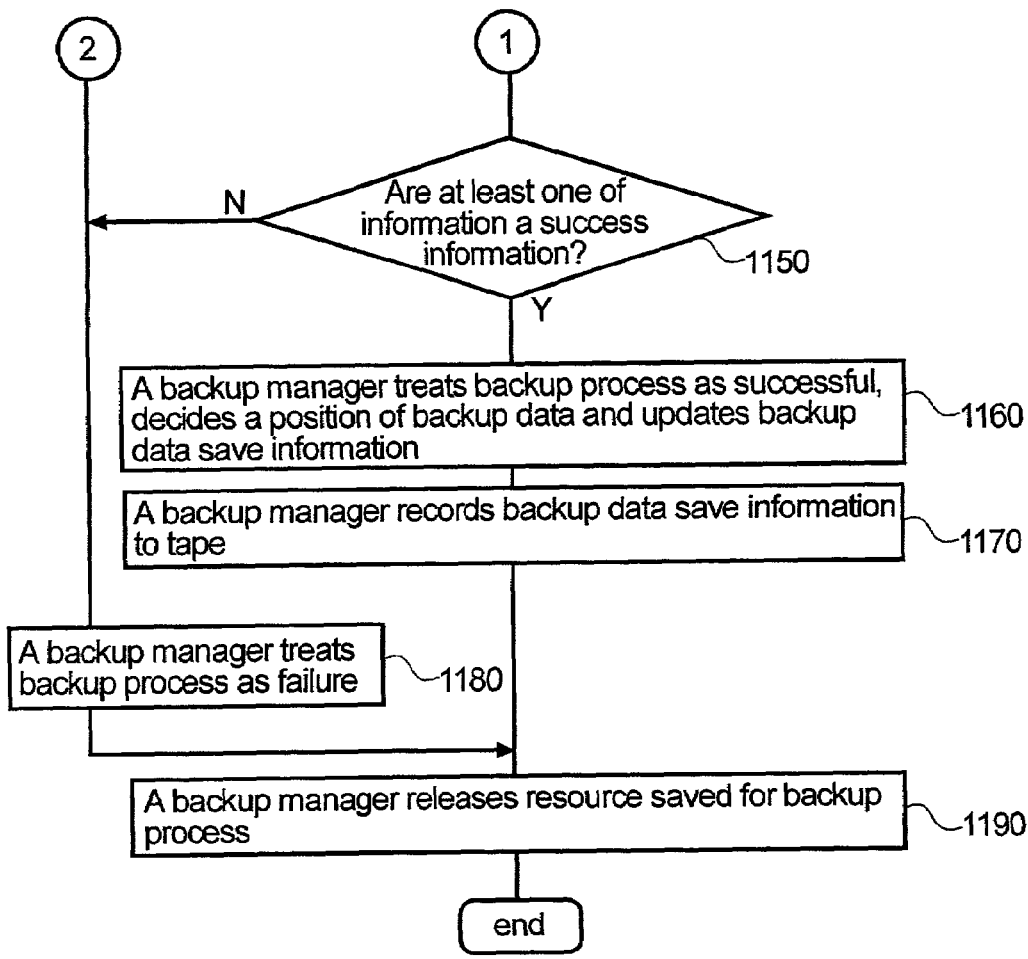
FIG. 9 is an example of backup data save information 460.

Backup processing by backup manager 400 is now described with reference to FIGS. 1, 7 and 8.

Backup manager 400 commences backup of the data specified by a backup data set in backup processing information 410 at the time and on the date given in the data set (Step 1000). Backup manager 400 instructs backup agent 110 of the host computer to prepare the backup (Step 1010).

Resource selection processor 401 of the backup manager 400 selects a backup server 300 from the usable backup servers by using backup server information 420. Resource selection processor 401 then changes the state information of the selected backup server 300 from "usable" to "in use", sets the process number of the selected backup server to the process number in the backup data set of backup processing information 410, and sets the stream number of the selected backup server to "0" (Step 1020). The selected backup server 300 is hereinafter called backup server "0".

In a similar manner, the resource selection processor 401 of the backup manager 400 uses library device information 430 and tape information 440, to select a library device 500 usable for the backup process and a tape 510 in the library device. Resource selection processor 401 then changes the state information of the selected library device 500 and tape 510 from "usable" to "in use," sets the process numbers of the selected library device 500 and tape 510 to the process number in the backup data set of backup processing information 410, and sets the stream numbers of the selected library device 500 and tape 510 to "0" (Step 1030). The selected library device 500 and tape 510 are hereinafter called library device "0" and tape "0", respectively.

Using FC switch information 450, route selection processor 402 of backup manager 400 selects an FC switch 600 to form routes among storage device 200, backup server "0", and library device "0". Then, route selection processor 402 changes the state information of the selected FC switch 600 from "usable" to "in use", sets the process number of the selected FC switch 600 to the process number in the backup data set of backup processing information 410, and sets the stream number of the selected FC switch 600 to "0" (Step 1040).

Then resource selection processor 401 and route selection processor 402 of backup manager 400 select another backup server 300, another library device 500, another tape 510, and another FC switch 600 in the same way as described above, but all are given stream number "1", to secure another backup route or subsystem (Steps 1050 to 1070). The backup server 300, library device 500, and tape 510 so selected are hereinafter called backup server "1", library device "1", and tape "1", respectively.

If resource selection processor 401 and route selection processor 402 fail to secure two backup routes, or subsystems, as described above, the backup processor 403 of backup manager 400 regards the backup process as a failure, releases the secured resources, and records the failure in a log (Steps 1180 and 1190). In addition, backup processor 403 may notify the user of the failure.

If two backup routes, or subsystems, are secured, backup processor 403 of backup manager 400 controls library device "0" to prepare for recording the data onto the tape "0" (Step 1090).

Then backup processor 403 of backup manager 400 notifies backup server "0" of the data to be backed up, the library device "0", and the tape "0", and instructs backup server "0" to back up the data onto tape "0" (Step 1100).

Backup server "0" reads out the data to be backed up from storage device 200, transfers the data to library device "0", and writes the data onto tape "0". When the backup process has successfully completed, backup server "0" notifies backup processor 403 of the successful completion of the backup process. If the backup process ends in an irregular way, backup server "0" notifies backup processor 403 of the irregular termination (Step 1110).

While the above backup process is being executed, the backup processor 403 prepares library device "1" and instructs backup server "1" to back up the data onto tape "1". As in the case of the backup process described above, backup server "1" executes the backup process and notifies backup processor 403 of the result of the backup process (Steps 1120 to 1140).

Backup processor 403 receives the information on the results of the backup processes from the backup servers "0" and "1" and checks the contents of the information to determine whether the backup processes were successes or failures (Step 1150). If both the backup processes fail, the backup of the data is regarded as failure (Steps 1180 and 1190). If either of the backup processes is successful, the backup of the data is regarded as a success and backup processor 403 finds a storage area for the backed-up data and updates the backup data save information 460 (Step 1160).

An example of backup data save information 460 is described with reference to FIG. 9. A field in the "Object" column identifies backed-up data and includes information to distinguish logical or physical volumes, file names (identifiers), database table names (identifiers), etc. "Start Time" means the time and date when a data backup process was started. "End Time" means the time and the date when the data backup process ended. "Data Time" means the time and the date of the data as backup data. "Library Device Number" and "Tape Number" are the numbers of a library device 500 and a tape 510 in which the backup data were stored, corresponding to "Library Device Number" in library device information 430 and "Tape Number" in tape information 440, respectively. The "Data Position" column contains information on the storage area of the backup data on tape 510; for example, block addresses or the number of bytes of an offset from the head. "Data Size" is the size of the backup data in, for example, numbers of blocks or bytes.

If one of the two backup processes described above is successful, backup processor 403 records, in backup data save information 460, the numbers of the library device and the tape on which the data have successfully been stored. If two or more backup processes are successful, the numbers of library device 500 and tape 510 of any of the backup processes, or the numbers of library devices 500 and tapes 510 of two or more backup processes, are recorded in the backup data save information 460. The storage areas of the backup data on some or all of the tapes 510 or the storage area of the backup data on either tape 510 is also recorded in the backup data save information 460. Thus, for example, backup results of only the first successful process can be selected.

Backup processor 403 of backup manager 400 stores all or part of the backup data save information 460 onto each tape 510 (Step 1170) and thus can collect the information from each tape 510 as the need arises.

Backup processor 403 changes the states of backup server information 420, library device information 430, tape information 440, and FC switch information 450 used for the backup processes from "in use" to "usable", releasing the resources secured for the backup processes, and completes those processes (Step 1190).

Figure 10:
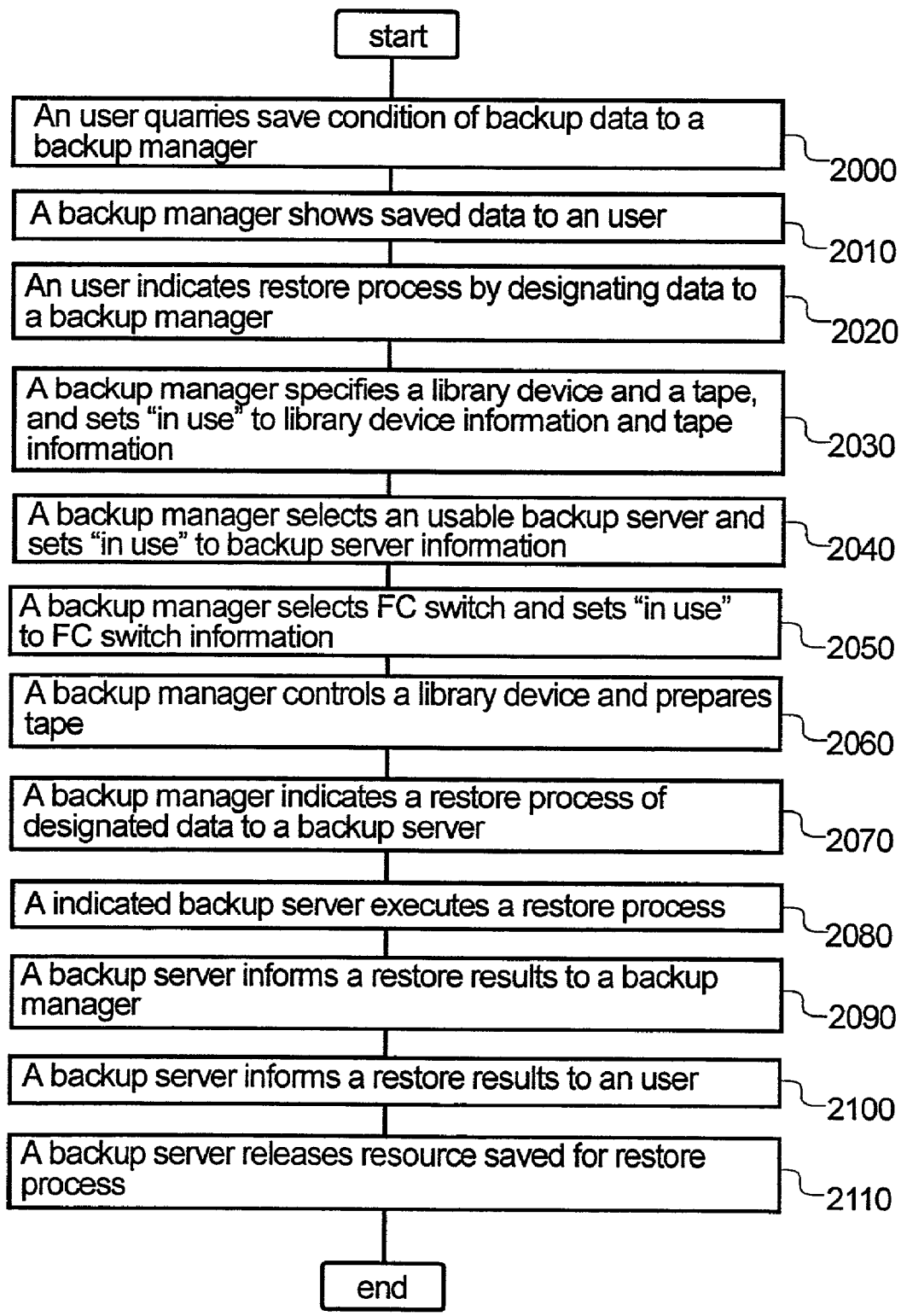
FIG. 10 is a flowchart of restore processing by backup manager 400.

The restore process performed by backup manager 400 is now described with reference to FIG. 10. If data stored in storage device 200 are lost due to operational trouble or trouble with some device, the user checks with restore processor 404 of backup manager 400 about the save condition of backup data (Step 2000).

Restore processor 404 provides information on the backup data to the user by using the backup data save information 460 (Step 2010).

The user chooses the data to be restored, assigns a storage area in storage device 200 for the data restoration, and instructs restore processor 404 to restore the data (Step 2020).

Using the backup data save information 460, restore processor 404 specifies the library device 500 and the tape 510 storing data to be restored and specifies the data storage area on the tape. Restore processor 404 then refers to library device information 430 and tape information 440, makes sure that the states of the indicated library device 500 and the indicated tape 510 are "usable" and changes the states of the indicated library device and the indicated tape to "in use" (Step 2030).

In addition, using backup server information 420, restore processor 404 selects a backup server 300 to be used for the restoration from the "usable" backup servers, and changes the state of backup server information 420 for the selected backup server from "usable" to "in use" (Step 2040). Further, restore processor 404 selects an FC switch 600 to form routes among the indicated library device, the selected backup server and storage device 200, and then changes the state information of the selected FC switch 600 to "in use" in FC switch information 450 (Step 2050).

Then restore processor 404 prepares library device 500 so that the data to be restored can be obtained from tape 510 (Step 2060).

Restore processor 404 then notifies the selected backup server 300 of the indicated library device, the indicated tape and the data to be restored, specifies the data storage area on the tape and the area to which the data will be restored, and instructs the backup server 300 to perform the data restoration (Step 2070).

Upon receiving the instruction, backup server 300 reads out the data to be restored from tape 510 of library device 500, and restores the data in the assigned storage area of storage device 200 (Step 2080).

When the requested restore process has successfully completed, backup server 300 notifies restore processor 404 of the successful completion. If the restore process ends in an irregular way, backup server 300 notifies restore processor 404 of the irregular termination (Step 2090).

Restore processor 404 records the results in a log and notifies the user of a successful completion, or of a failure if the restoration process ends irregularly (Step 2100).

Restore processor 404 changes the state of various information for the restore process from "in use" to "usable", releasing the resources so secured, and completes the restore process (Step 2110).

As described above, in the backup processing system according to the present embodiment, resources and routes needed for backing up data to be used by host computer 100 are dynamically secured as required to form a plurality of backup subsystems, and backup processing is executed in parallel by the plurality of backup subsystems. Therefore, even when trouble occurs during any of the multiple backup operations, the backup process is not prolonged and can be completed within a given time.

In the backup processing described above, the backup is executed in parallel by a plurality of backup servers 300. In the backup processing described below with reference to FIGS. 11 and 12, however, a copy device 610 (see FIG. 1), which makes copies of data for the backup is switched when trouble occurs.

Figure 11:
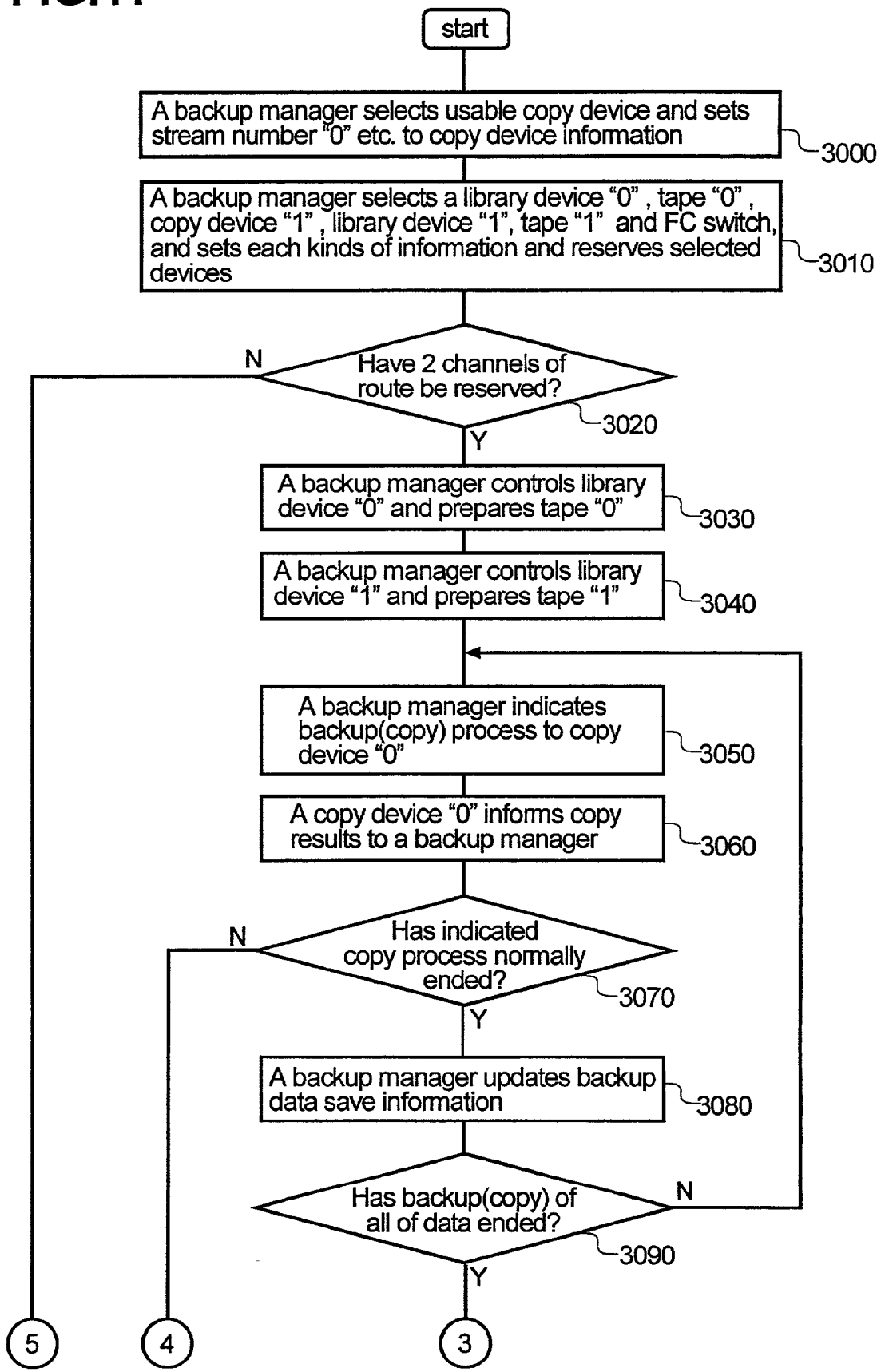

FIGS. 11 and 12 show a flowchart of backup processing by backup manager 400 in accordance with another embodiment of the present invention. As in the processing described above, resource selection processor 401 of backup manager 400 starts backup processing. Using copy device information 470, the resource selection processor selects a copy device 610 to be used for backup processing from the usable copy devices and sets copy device information 470 (Step 3000).

The selected copy device 610 is hereafter called copy device "0". The selection of copy device "0" and the setting of the copy device information 470 by backup manager 400 are the same as was done with backup server 300 and backup server information 420 in previously described backup processing.

FIG. 13 is an example of copy device information 470 contained in backup manager 400 of the present embodiment. The numbers in the "Copy Device Number" column identify the copy devices 610. The "Copy Device Name" column lists the names (identifiers) of the copy devices 610. The state, process numbers and stream numbers are the same as those in backup server information 420.

Further, as in the backup process described above, backup manager 400 selects library device "0", tape "0", copy device "1", library device "1", tape "1" and an FC switch 600, and secures the selected equipment (resources) by setting the various information (Step 3010). If backup manager 400 fails to secure two or more backup routes or subsystems, then, as in the previously described backup process, the backup manager regards the backup process as a failure (Step 3160) and releases the resources secured for the backup process (Step 3170).

When two or more routes or subsystems are secured, backup processor 403 of backup manager 400 controls library device "0" and library device "1" to prepare for the recording of the data onto tape "0" and tape "1" (Steps 3030, 3040).

Then backup processor 403 instructs copy device "0" to backup (copy) the target data (i.e., the data to be backed up) into the onto tape "0" of library device "0" (Step 3050). An example of a backup command instructing the copy is an EXTENDED COPY command specified in the SCSI (Small Computer System Interface). When EXTENDED COPY commands are used, copying can be instructed by specifying a device from which data is copied, a device to which data is copied, an address of the area from which data is copied, an address of the area to which data is copied and copy length, etc., as parameters.

Backup processor 403 executes copying of the data to be backed up by dividing that data into multiple processes with multiple EXTENDED COPY commands. If the data to be copied, for example, is 100 Mbytes in size, copy length is set as 10 Mbytes using 10 commands, and the copying process is repeated 10 times. By dividing the copy process, fineparticle size by command during a trouble-shooting procedure can be realized. Further, prompt trouble-shooting is provided and the backup process can be continued.

Copy device "0" executes the instructed copy process, and informs backup processor 403 of successful completion when the copy process is successfully completed and of an irregular termination when the copy process comes to an irregular end (Step 3060).

Upon receiving a report of successful completion, backup processor 403 records in backup data save information 460, the library device "0", tape "0", and the storage area of data on the tape, with respect to the data whose copy process has been successfully completed (Step 3080). When there is data which has not yet been copied, backup processor 403 issues the next copy command to the copy device "0" (Step 3090). When the whole copying process of the data to be backed up has been completed, the backup process is regarded as successful (Step 3150) and the resources secured for the backup process are released (Step 3170).

When backup processor 403 receives a report of an irregular termination of the copy process from copy device "0", or reaches a time-out without receiving any reports from copy device "0", the backup processor indicates that the data whose copy process has not successfully completed will now be copied by copy device "1" to tape "1" of library device "1" (Step 3100).

The copy device "1" executes the instructed copy process and, as described above, informs backup processor 403 of the copy results (Step 3110).

When a report of successful completion is received, backup processor 403 stores in backup data save information 460, library device "1", tape "1" and the storage area of data on the tape, with respect to the data whose copying has been successfully completed (Step 3130). If there is data which has not yet been copied, the backup processor issues the next copy instruction command to copy device "1" (Step 3140).

When the whole copying process of the data to be backed up has been completed, the backup process is regarded as successful (Step 3150) and the resources secured for the backup process are released (Step 3170). When backup processor 403 receives a report of an irregular termination of the copy process from copy device "1", or reaches a time-out, the backup process is regarded as failure (Step 3160) and the resources secured for the backup process are released (Step 3170).

When switching of the backup processes occurs, as described above, the backup data is divided into multiple sections and stored in two or more library devices 500 and tapes 510. Such sections of the backup data and their storage area are respectively recorded in saved backup data information 460 and managed. Namely, the backup data save information 460 may have entries of multiple storage areas with respect to backup data of data that was selected for backup.

As described above in the restore process, when backup manager 400 restores data, it requests, using backup data save information 460, identification of the restorable data and the storage area of data to be restored. However, when the backup data (data to be restored) is divided and stored, as described immediately above, restore processor 404 of the backup manager 400 obtains, using backup data save information 460, the identification of each storage area (the tape 510 of the library device 500). Restore processor 404 then sequentially secures the library device/tape, gives a restore instruction to backup server 300 or to copy device 610 and then releases the library device/tape, eventually restoring all the data.

As previously described, in the backup processing system of the present embodiment, resources and routes needed for backing up data to be used by a host computer 100 are dynamically secured, according to the state of each resource, to form a plurality of backup subsystems. Therefore, when trouble occurs during any of the multiple backup processes, backup processing continues in another system and such processing, being free of delays, can be completed within a given time.

The backup process described above starts with an instruction of a user, according to a date and time set by backup process information 410. Alternatively, the user may give an instruction to start the backup immediately, in an on-demand manner.

Further, FC switch 600 may have a zoning function grouping multiple ports managed by the FC switch 600 and allowing access and transfer within each group. Accordingly, in selecting and securing resources (routes) described above for backup and restore processing, backup manager 400 sets FC switch 600 via a network 800, executes zoning the selected route as an independent route and carries out the processing so that the data transfer of the backup or restore processing does not influence a transfer in the processing being executed by another computer and is not influenced by such transfer.

In both of the above-described backup processes, two resources (routes) are secured and the processing is carried out. However, in order to improve the trouble-prevention function of the present invention, three or more routes may be used to carry out the processing.

In the backup and restore processing described above, when data to be backed up or restored are files or database tables, backup manager 400 and backup server 300 have means to translate file management and database management information to other file formats or database formats as needed or otherwise deemed appropriate.

Further, the backup processing method described above can be applied when creating a copy (snapshot) of data on the storage device 200 and acquiring the backup with respect to the copy.

In the above description, host computer 100, backup server 300 and backup manager 400 are shown as different computers. However, one or more computers may have the means and functions of the above computers, and may carry out backup processing in the same way as described above.

In the backup processing described above, backup manager 400 manages various information and carries out the backup processing using backup server 300. However, as an example of an alternative configuration, each backup server 300 may manage while synchronizing the information so that the contents will be the same on each backup server 300, and can achieve the backup processing by carrying out the processing previously done by the backup manager 400 in the above description.

Moreover, in the description of the backup process, the routes are switched with the occurrence of an irregular termination of the EXTENDED COPY command. However, routes may be switched by using other transfer instruction methods. For example, such as with the occurrence of an irregular termination of a data transfer based on a block, a track or a cylinder from storage device 200, transferred as a unit.

Further, in the backup process described above, the storage area of the backup data is on tape 510 of library device 500. However, other storage devices such as a single magnetic disk unit or a magnetic disk unit with a controller having a RAID configuration, etc., may be used.

As described above, according to the backup processing system of the present invention, resources and routes needed for backing up data to be used by a data-processing computer system are dynamically secured to form multiple backup subsystems, and backup processing is executed by the subsystems. Therefore, backup processing is prevented from being delayed when trouble occurs during backup processing.

The foregoing invention has been described in terms of the preferred embodiments. However, those skilled, in the art will recognize that many variations of such embodiments exist. Such variations are intended to be within the scope of the present invention and the appended claims.

What is claimed is:

1. A backup processing method for backing up data to be used by a data-processing computer, the method comprising the steps of:
    selecting resources in a usable state from a plurality of resources necessary for backing up data stored in a disk storage system, the data to be used by the data-processing computer, the selected resources including a first storage unit to store at least some of the data in the disk storage system as backup-data and a second storage unit different from the first storage unit to store at least some of the data in the disk storage system as backup-data;
    selecting a first switch from a plurality of switches, the first switch in data communication with the disk storage system and with the first storage unit thereby providing a first path therebetween;
    selecting a second switch from the plurality of switches which is different from the first switch, the second switch in data communication with the disk storage system and with the second storage unit thereby defining a second path therebetween;
    executing backup processing by using the first path and a backup instruction command set having a plurality of backup commands, each backup command backing up a different portion of the data from the disk storage system to the first storage unit as backup data, every portion of the data having a corresponding backup command, the backup processing including executing one or more of the backup commands;
    detecting if a problem occurs in the first path based on a result of execution of one of the backup commands in the backup instruction command set;
    changing from the first path to the second path if a problem is detected; and
    continuing execution of the backup processing by using the second path and executing backup commands in the backup instruction command sets that have not yet been executed.

2. A backup processing method according to claim 1, wherein backup processing is executed by using the first or the second path, and when the backup processing has been fully executed by one or both of the paths, regarding the backup processing as successful.

3. A backup processing method according to claim 2, further including a step of storing information relating to the backup processing of the backed-up data.

4. A backup processing method according to claim 2, further including a step of storing information relating to whether the backup processing of the backed-up data was successfully executed.

5. A backup processing method according to claim 4, wherein data stored relating to the successful execution of the backup processing is used to determine if the data can be restored.

6. A backup processing method according to claim 1 further comprising terminating execution of the backup processing if the second path is not secured.

7. A computer managing a system which includes a plurality of resources, comprising:
    a processing unit; and
    a network interface connectable to the plurality of resources via a network,
    wherein the processing unit is operable to:
        select resources in a usable state from the plurality of resources necessary for backing up data stored in a disk storage system;
        determine which of the selected resources are secure;
        secure a first group from among the selected resources to define a first path between the disk storage system and a first storage resource;
        secure a second group from among the selected resources to define a second path between the disk storage system and a second storage resource different from the first storage resource;
        initiate first backup processing via the first path by issuing a backup instruction command set via the network interface to the first group of resources, the backup instruction command set having a plurality of backup commands, each backup command effective to backup a portion of the data stored in the disk storage system into the first storage resource as first backup data, wherein one or more of the backup commands are executed to backup one or more portions of the data via the first path;
        detect if a problem occurs in the first path based on a result of execution of one of the backup commands;
        initiate a change from the first path to the second path if the problem is detected; and
        initiate second backup processing via the second path by issuing a remaining portion of the backup instruction command set via the network interface to the second group of resources, the remaining portion of the backup instruction command set including those backup commands which had not been previously executed to backup remaining portions of the data stored in the disk storage system into the second storage resource as second backup data.

8. A computer according to claim 7, wherein the processing unit terminates execution of the backup processing if the second path is not secured.

9. A computer according to claim 8, wherein backup processing is executed by using the first path or the second path, and if the backup processing has completely executed using either or both of the first path or the second path, then regarding the backup processing as successful.

10. A computer according to claim 9 further comprising a memory,
    wherein the processing unit stores information relating to whether the backup processing of the backed-up data was successfully executed,
    wherein the processing unit indicates to execute data restore based on the information.

11. A computer according to claim 7 further comprising a memory,
    wherein the data that is backed up is referred to as backed-up data and can be stored in the first storage resource in the first path or in the second storage resource in the second path, wherein the processing unit stores backup information relating to the backup processing of the backed-up data into the memory, the backup information indicating which portions of the backed-up data are stored in the first storage resource and which portions of the backed-up data are stored in the second storage resource, wherein the processing unit initiates restoring of the backed-up data based on the backup information, including performing steps of:

accessing the backup information in connection with a first portion of the backed-up data and determining whether the first portion is stored on the first storage resource or on the second storage resource;

accessing either the first storage resource or on the second storage resource to obtain the first portion; and repeating the above steps for additional portions of the backed-up data, thereby restoring the data from the backed-up data.

12. A system comprising:

a disk storage system;

a plurality of backup disk storage systems;

a plurality of copy devices;

a plurality of switches which are connectable among the disk storage system, the plurality of backup disk storage systems and the plurality of copy devices; and a management computer connectable to the plurality of switches, the disk storage system, the plurality of backup disk storage systems and the plurality of copy devices via a network, wherein the management computer is operative to:

select backup disk storage systems in a usable state from the plurality of backup disk storage systems necessary for backing up data stored in the disk storage system;

select switches in a usable state from the plurality of switches necessary for forming routes from the disk storage system to the selected backup disk storage systems, thereby securing a first group of selected backup disk storage systems and selected switches as a first route for backup operations and securing a second group of selected backup disk storage systems and selected switches as a second route for backup operations;

select a first copy device in a usable state from the plurality of copy devices for the first route and a second copy device in a usable state from the plurality of copy devices for the second route; and initiate execution backup processing via the first route by issuing backup instruction command set including a plurality of backup commands, each backup command indicating to transfer part of the data stored in the disk storage system to the first copy device or to the second copy device, wherein the first copy device sends portions of data from the disk storage system as backup data be stored in a first backup disk storage system included in the first route in accordance with one or more of the backup commands as backup data, and notifies the management computer if an error in the first route is detected, wherein the management computer initiates execution backup processing via the second route by issuing a remaining portion of the backup instruction command set to the second copy device if the management computer receives an error notification from the first copy device, wherein the second copy device sends data from the disk storage system as backup data to be stored in a second backup disk storage system included in the second route in accordance with the remaining portion of the backup instruction command set.

13. A system according to claim 12, wherein the management computer terminates execution of the backup processing if the second route is not secured.

14. A system according to claim 13, wherein backup processing is executed by using the first route or the second route, and when the backup processing has been successfully executed by at least one route, regarding the backup processing as successful.

15. A system according to claim 14, wherein the management computer stores information relating to whether the backup processing of the backed-up data was successfully executed, wherein the management computer selects the first route based on the information, indicates the copy device to execute data restore from a library system included in the first route to the storage system via the first route.

* * * * *